United States Patent
Jain

(10) Patent No.: US 9,594,211 B1
(45) Date of Patent: Mar. 14, 2017

(54) METHOD OF FABRICATION OF LOW-BEND-LOSS SINGLE MODE FIBERS OF VERY LARGE MODE AREAS

(71) Applicant: Ravinder Jain, Albuquerque, NM (US)

(72) Inventor: Ravinder Jain, Albuquerque, NM (US)

(73) Assignee: STC. UNM, Albuquerque, NM (US)

( * ) Notice: Subject to any disclaimer, the term of this patent is extended or adjusted under 35 U.S.C. 154(b) by 0 days.

(21) Appl. No.: 14/659,422

(22) Filed: Mar. 16, 2015

Related U.S. Application Data

(60) Provisional application No. 61/953,886, filed on Mar. 16, 2014.

(51) Int. Cl.
| | | |
|---|---|---|
| G02B 6/028 | (2006.01) | |
| G02B 6/036 | (2006.01) | |
| B29D 11/00 | (2006.01) | |
| C03B 37/016 | (2006.01) | |
| C03B 37/02 | (2006.01) | |
| B29K 105/00 | (2006.01) | |

(52) U.S. Cl.
CPC ........ *G02B 6/028* (2013.01); *B29D 11/00682* (2013.01); *B29D 11/00721* (2013.01); *C03B 37/016* (2013.01); *C03B 37/02* (2013.01); *G02B 6/036* (2013.01); *B29K 2105/253* (2013.01); *B29K 2995/0031* (2013.01); *C03B 2203/22* (2013.01)

(58) Field of Classification Search
CPC ................................ G02B 6/028; G02B 6/036
See application file for complete search history.

(56) References Cited

U.S. PATENT DOCUMENTS

| | | | | |
|---|---|---|---|---|
| 6,539,155 | B1* | 3/2003 | Broeng | B29D 11/00721 385/125 |
| 6,711,918 | B1* | 3/2004 | Kliner | C03B 19/106 65/390 |
| 7,876,495 | B1* | 1/2011 | Minelly | C03B 37/0122 359/341.1 |
| 8,755,660 | B1* | 6/2014 | Minelly | C03B 37/0122 359/341.1 |
| 9,140,873 | B2* | 9/2015 | Minelly | C03B 37/0122 |
| 2015/0043879 | A1* | 2/2015 | Minelly | C03B 37/0122 385/127 |

* cited by examiner

*Primary Examiner* — Rhonda Peace
(74) *Attorney, Agent, or Firm* — Keith A. Vogt; VOGT IP

(57) ABSTRACT

The present invention provides an optical fiber and method of making the same. The optical fiber includes a body for transmitting light. The body has an anisotropic refractive index wherein the anisotropic refractive index offsets changes in the refractive index of the fiber caused by bending the fiber. The fiber body may further include a core and cladding.

14 Claims, 10 Drawing Sheets

Outline of the outer tube that holds many capillary tubes in hexagonal symmetry; this is fused to form the holey fiber perform This part is removed to form a rectangular shaped preform (and fiber)

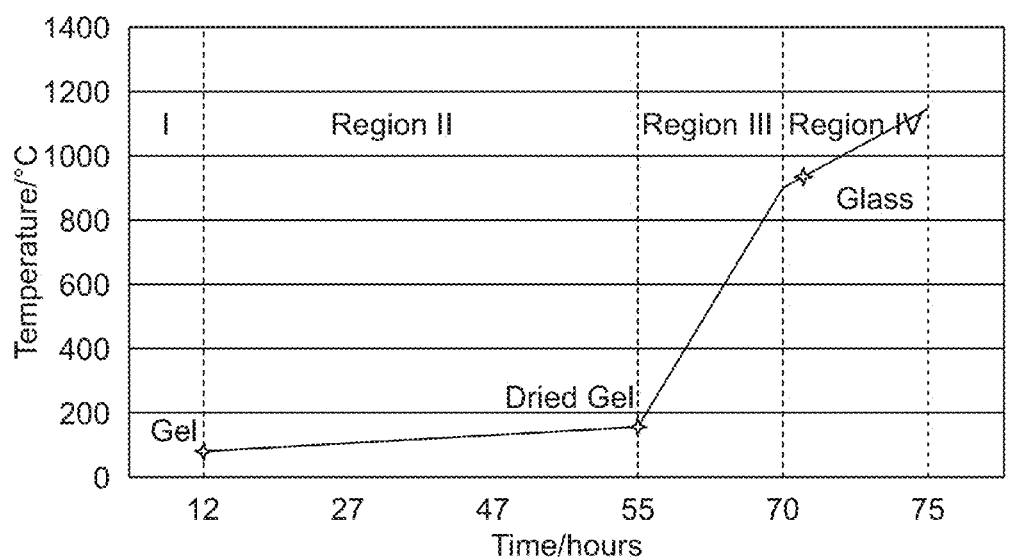
FIG. 15
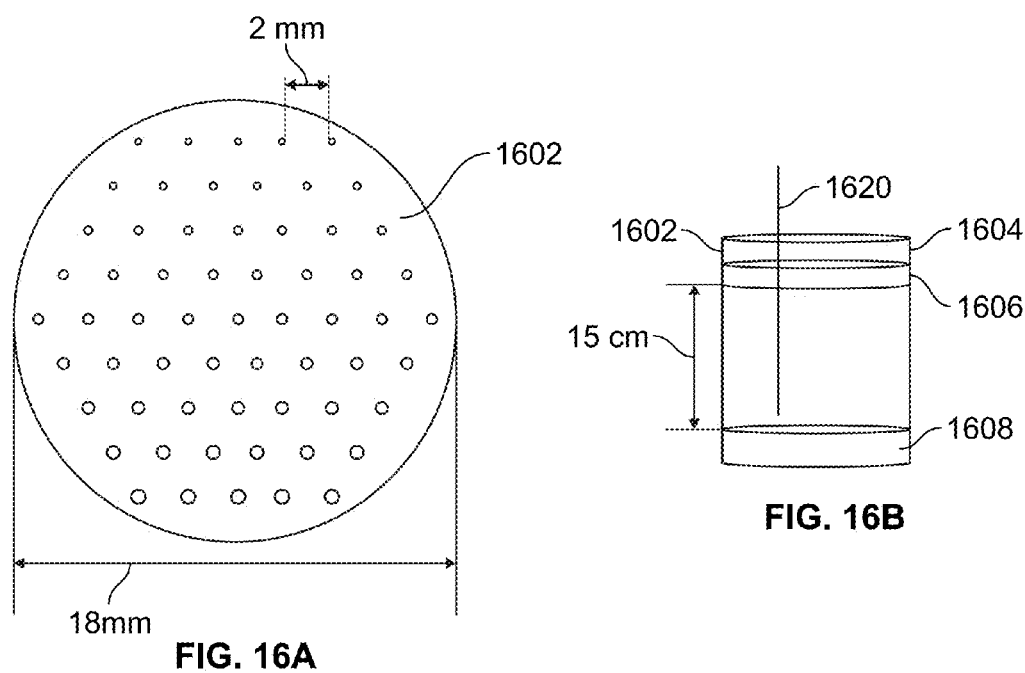
FIG. 16A
FIG. 16B

METHOD OF FABRICATION OF LOW-BEND-LOSS SINGLE MODE FIBERS OF VERY LARGE MODE AREAS

RELATED APPLICATIONS

This application claims the benefit of U.S. Provisional Application No. 61/953,886, filed Mar. 16, 2014 and herein incorporated by reference.

STATEMENT REGARDING FEDERALLY SPONSORED RESEARCH & DEVELOPMENT

This invention was made with government support under an AFOSR Grant entitled "Optoelectronics Research Center", AFOSR Grant FA9550-12-1-0049 and ARO HBCU/MI Grant W911NF1310111, Proposal #62755-EL-REP. The government has certain rights in the invention

INCORPORATION BY REFERENCE OF MATERIAL SUBMITTED ON A COMPACT DISC

Not applicable.

BACKGROUND OF THE INVENTION

Single-mode large mode area (LMA) fibers, which are important for high power fiber lasers, can maintain large mode areas when straight, but are poor at maintaining large mode areas when bent. Likewise, very large mode area (VLMA) fibers that have been fabricated so far have extremely high mode losses and low values for mode areas when bent. Successful design and fabrication of a bendable, large mode area fiber will not only improve compact, high-power fiber lasers, but also improve other applications, which rely on bendable optical fibers.

In addition, in a single-mode fiber amplifier or laser, limitations in scaling of the output powers come from the high intensities in the fiber, which can cause thermal and optical damage and also limit power scaling due to the onset of various nonlinear mechanisms. Nonlinear processes such as stimulated Raman scattering (SRS), self-phase modulation (SPM), and—particularly for narrow-linewidth/single-frequency laser operation—stimulated Brillouin scattering (SBS) are limiting factors. The impact of these nonlinear effects is proportional to the optical intensity. Thus, the effective mode area, $A_{eff}$, needs to be scaled for the attainment of high output powers from such fiber lasers to minimize the intrafiber intensity and thus the impact of various nonlinear optical effects. Consequently, a requirement for a multi-kW single element fiber laser/amplifier is that the mode field diameter be >15 μm, although much larger mode field diameters (>30 μm are preferable).

The use of practical doping levels and of double-clad and triple-clad fiber geometries, in which the outer claddings facilitate high-efficiency coupling of high power pump diodes into the fiber—and the requirement of near-complete absorption of the pump diode radiation to maximize efficiency—necessitates the use of fiber lengths that are usually of the order of a few meters. In order to achieve practical and compact fiber laser designs that are both rugged and portable, it is highly desirable that VLMA fibers are bendable to coil radii of 30 cm or smaller, with smaller fiber coil diameters (typically <40 cm) being preferable.

BRIEF SUMMARY OF THE INVENTION

In one embodiment, the present invention provides a novel unidirectionally-graded refractive index profile (UGRIP) optical fiber design based on a material index gradient that yields robust single-modedness, large mode areas, and effective suppression of HOMs (higher order modes). The present invention reduces mode loss and modal deformation, particularly in the lowest order mode, that inevitably occurs during bending of conventional "step index" (SI) fibers and leakage channel optical fibers (LCFs). These fibers will in general consist of a core whose average refractive index is generally higher than that of the cladding layers surrounding it; the core region is the primary region containing the amplified light in laser and amplifier fibers.

In other embodiments, the present invention provides novel unidirectionally graded refractive index profile rare-earth doped double clad VLMA fibers for improved beam quality and improved efficiency. In other embodiments, the present invention provides power-scalable single element fiber lasers and fiber amplifiers in appropriately-designed coiled geometries. The improved beam quality is caused by the improved propagation characteristics of the lowest order mode in the fiber. Higher efficiency is achieved from reduced propagation loss and improved modal overlap of the mode with the gain region in the doped fiber amplifier cores.

In yet other embodiments, the present invention provides UGRIP fibers that provide minimal modal distortion and large effective mode areas for the fundamental mode at a bend radius less than 50 cm.

In further embodiments, the present invention makes use of arrays of doped and undoped rods of various optical materials (typically glasses) of precise refractive indices as cells or sub-cells in the materials to fabricate preforms used to draw the fibers, and the use of microstructured fiber fabrication methods based on doped and undoped capillaries or tubes of optical materials (typically glasses) to precisely control the average refractive index of each cell or sub-cell in the fiber to create UGRIP fibers that are either non-birefringent or can achieve high birefringence and thus single polarization laser outputs.

In other embodiments, the present invention makes use of microstructured fiber technology and the potential use of external low-index glasses or polymers or "air-clad" rings in the perimeter of such fibers, resulting in UGRIP fibers that provide a very high degree of flexibility in double-clad and triple-clad designs as well as other cladding configurations and designs.

In yet further embodiments, the present invention achieves linewidths of <100 GHz for beam combining applications. In yet further embodiments, the present invention achieves linewidths of <10 GHz for beam combining applications In still further embodiments, the present invention provides a bendable optical fiber having a body for transmitting light wherein the anisotropic refractive index of the body is generally unidirectional with a generally higher refractive index at the edge closest to the center of curvature and generally decreasing in a direction away from the center of curvature for the bend, such that the rate of refractive index variation as a function of the transverse dimension of the fiber that is aligned with the direction of bending is proportional to the first order on the inverse of the design bend radius. As stated above, in general, the fiber body will usually include one or more cores and one or more cladding layers but may be a solid body as well.

The present invention also provides embodiments that achieve suppression of stimulated Brillouin scattering (SBS) in VLMA fibers by the use of fiber designs with acoustic modes having minimal overlap with optical modes.

The present invention also provides embodiments that are compatible with fiber side-coupled pumping options for additional power scalability. The use of D-shaped coreless pumping fibers and hexagonal (or rectangular) cladding shaped UGRIP fibers may be used for power scaling using fiber side-pumping geometries.

In other embodiments, the present invention provides methods of fabricating a large mode area (VLMA) fiber with a reduced numerical aperture (NA) by using the precise index control of the refractive index in the fiber that can be obtained by appropriately varying hole sizes in microstructured fibers.

In one embodiment, the design of the fiber of the present invention involves using a fiber in which the refractive indices in the core and cladding are pre-tilted to maintain minimum mode loss when the fiber is bent. In still other embodiments, the present invention provides a fiber that has a refractive index pre-tilt of $1.5 \times 10^{-5}/\mu m$ and the fiber has a mode area greater than 500 um$^2$.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 15 is another sol-gel heating profile of an embodiment of the present invention.

FIGS. 16a and 16b provide a side view and cross-sectional view of a sol-gel mold of an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Optical fiber bend loss is related to the radius of curvature R of a typical step index fiber. When the actual radius of curvature approaches a critical value $R_c$, the bend loss increases sharply from negligible values to intolerably large values, implying very large bend losses when fibers with $A_{eff} > 1000\ \mu m^2$ are not kept straight. An approximate expression for $R_c$ is given by: $R_c \approx 20\lambda/[\sqrt{\Delta n}(2.748-0.996\lambda/\lambda_c)]^3$, where the critical radius is a function of the refractive index difference ($\Delta n$), the operating wavelength ($\lambda$) and the cutoff wavelength ($\lambda_c$). For a single-mode step index fiber, for a desired mode area, $A_{eff}$ (and a wavelength of 1.55 μm), Table 1 depicts calculated values of the core radius, numerical aperture (NA), and the critical bend radius, $R_c$.

TABLE 1

Parameters of step index optical fibers and critical bend $R_c$ for different desired mode areas in single mode fibers (assuming a normalized frequency V = 2.405, $\lambda_c$ = 1.5 μm, $\lambda$ = 1.55 μm, ω = mode field radius and a radius of step index core)

| $A_{eff}$, desired mode area (μm²) | ω (μm) | a (μm) | NA | $\Delta n$ | $R_c$ (m) |
|---|---|---|---|---|---|
| 100 | 5.64 | 5.13 | 0.112 | 0.00431 | 0.022 |
| 300 | 9.77 | 8.88 | 0.065 | 0.00144 | 0.112 |
| 500 | 12.62 | 11.46 | 0.05 | 0.00086 | 0.241 |
| 1000 | 17.84 | 16.21 | 0.035 | 0.00043 | 0.683 |
| 2000 | 25.23 | 22.93 | 0.025 | 0.00022 | 1.932 |
| 3000 | 30.9 | 28.08 | 0.02 | 0.00014 | 3.549 |
| 4000 | 35.68 | 32.42 | 0.018 | 0.00011 | 5.464 |

Figure 1:
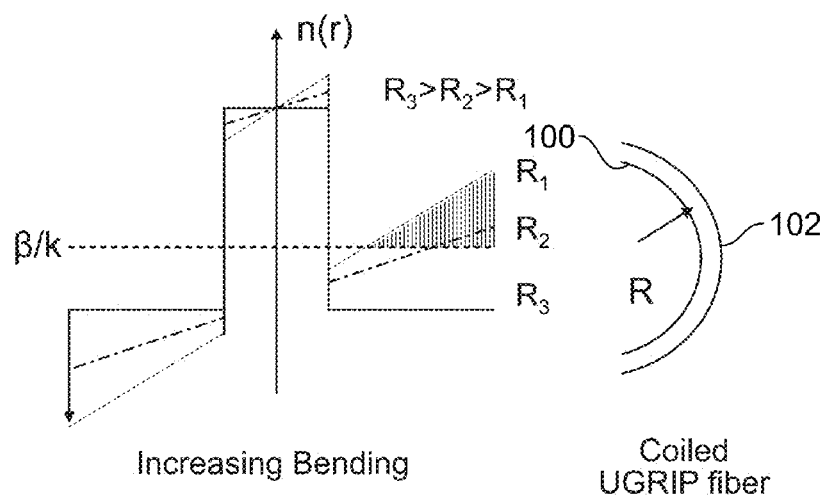
FIG. 1 shows an effective refractive index profile, as a function of bending for various radii of curvature in a tilted slanted refractive index UGRIP fiber of one embodiment of the present invention designed to yield a step-index profile at a pre-designed radius of curvature R=R3 (represented by the flat-line index profile).

An aspect of the present invention is illustrated schematically in FIG. 1. In a bent or curved fiber (as opposed to a straight fiber), the inner curved portion 100 of the fiber experiences an increase in the refractive index due to compressive stresses, whereas outer curved portion 102 experiences a decrease in the refractive index due to tensile stresses; however, there are much larger index opposing variations on the two sides of the bent fiber due to effective changes in the path length on the two opposite sides as a result of the bending of the fiber. As can be seen in FIG. 1, when the fiber is bent, there is an increase in optical path length at the outer edge of the bent fiber 102 and a decrease in path length at edge 100.

Using the following expression: $n_e^2 = n^2(r)(1+2r/R)$ for the effective refractive index profile of a uniform index fiber at a bend radius R, the effective refractive index or tilt due to the bending (at radius R) has a slope of $\delta n/\delta r \approx n/R$. The stress-induced index changes can be accounted for by adding another small multiplicative factor to this index gradient. Such bend induced index gradients can cause mode distortions and severe bend-induced propagation losses. The present invention, in one embodiment, negates or counteracts these bend-index losses by "pre-tilting" the index in the opposite direction to offset the bend-induced index changes. In one embodiment, the design of the fiber of the present invention involves using a fiber in which the refractive indices in the core and cladding are pre-tilted to maintain minimum mode loss at the desired modes, usually the lowest order mode, when the fiber is bent. In general, the fiber may have an anisotropic refractive index that has a predefined linear slope. In other embodiments, the anisotropic index variation may be nonlinear, curved and in other predetermined or predefined variations as well as a continuous rate of change.

Accordingly, to reduce bend loss in the optical fiber, in a preferred embodiment, the present invention provides an optical fiber comprising a core and a cladding wherein the refractive index of the core and the cladding varies anisotropically—in the direction of the bend—across the core and the cladding. In addition, the refractive index of the core alone, or within both the core and the cladding, may vary monotonically across the fiber, in such a manner that a significant portion of this variation is aligned along the direction of the bend. More specifically, in a bendable or bent fiber, the refractive index of the fiber decreases in a direction away from the direction in which the fiber is bent or curved. In yet another preferred embodiment, the refractive index of the optical fiber unidirectionally decreases in a direction away from the direction in which the fiber is bent or curved. In yet another embodiment, the bendable optical fiber comprises a core and/or cladding having an anisotropic refractive index wherein the anisotropic refractive index offsets changes in the refractive index of the fiber caused by bending the fiber. In yet other embodiments, the optical fiber has an anisotropic refractive index variation that is unidirectional and decreases in a direction away from the center of the bend, such that the rate of refractive index variation as a function of the transverse dimension of the fiber that is aligned with the direction of bending is proportional to the first order on the inverse of the design bend radius.

While the tilt has been described as being in the core, cladding or both, it may also be in a portion or part of the fiber. It is also within the scope of the present invention to view the tilt as being in the body of the fiber, with the body including one or more parts, portions or components of the fiber such as cladding and/or core.

In other embodiments of the present invention, the optical fiber may have a bend radius of between 3 cm and 50 cm with no significant bend loss. In a preferred embodiment, the fiber may have a refractive index pre-tilt of the order of $1.5 \times 10^{-5}/\mu M$ in UGRIP VLMA fibers of bend radii between 5 and 10 cm, and mode areas >1000 μm²; this pre-tilt will be increased for smaller design bend radii, and decreased for larger bend radii. In other embodiments, the fiber may have a refractive index pre-tilt of the order of $1 \times 10^{-5}/\mu m$ or $2 \times 10^{-5}/\mu m$ or in the range of $1 \times 10^{-3}$ to $1 \times 10^{-7}/\mu m$.

In certain embodiments, bend losses may be eliminated nearly completely while retaining very large mode areas in the fundamental mode even for very small design bend radii. This may be achieved by fabricating a fiber that has a pre-defined, built-in tilt in its core and/or cladding with one or more refractive index profiles that offset bend losses. For example, bending the fiber one way will cancel the built-in index while bending it the other way will increase the refractive index tilt. When the tilt is completely cancelled or substantially cancelled, the bend loss will be negligible and may be nearly eliminated vis-à-vis the needs of the device. Bending the fiber one way will cancel the built-in index while, bending it other way will increase the tilt. When the tilt is reduced or cancelled, there will be significantly reduced bend loss. Under these conditions it is possible to obtain very large mode area fibers with very small effective NAs.

Figures 2A, 2B, 2C:
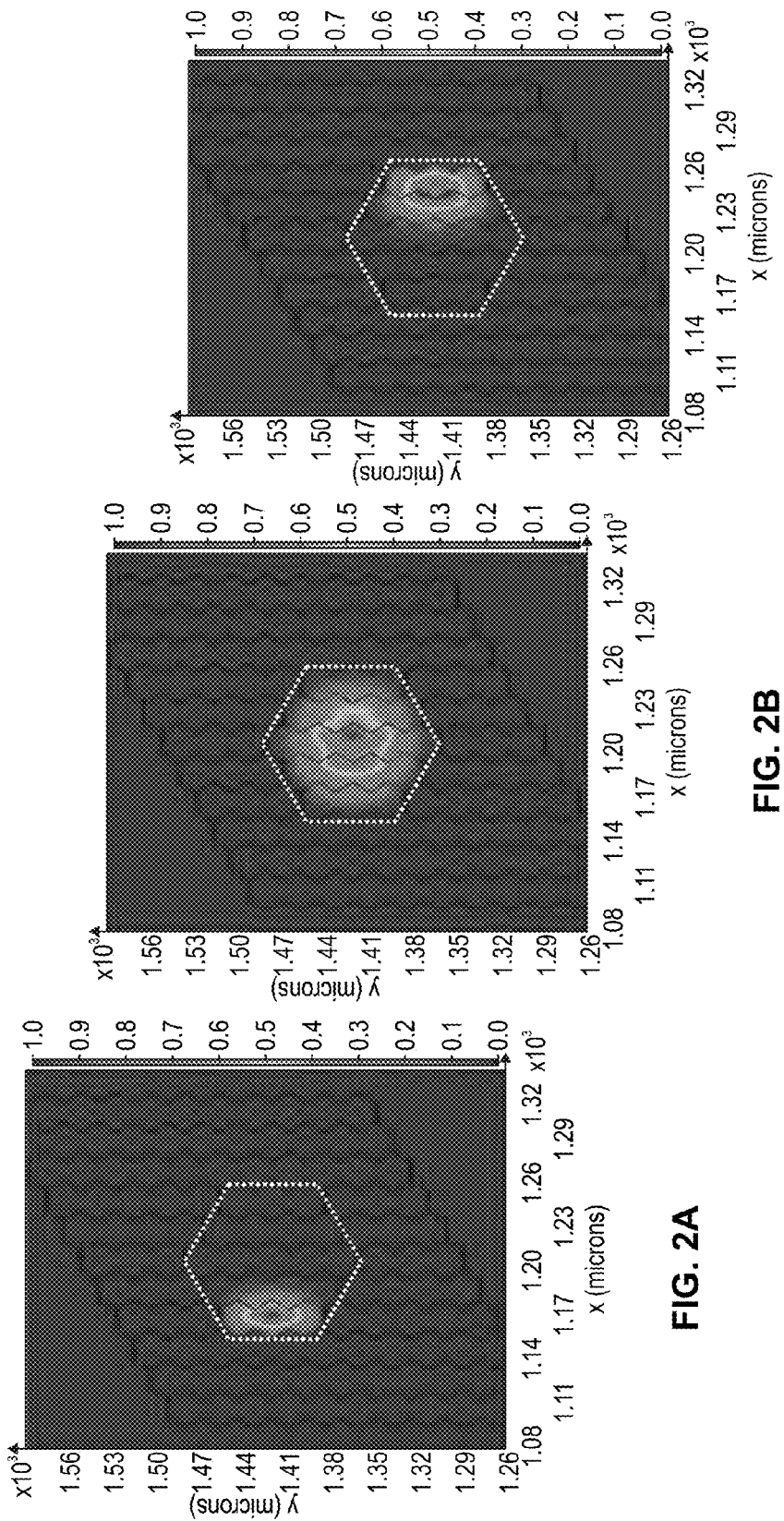
FIG. 2a show the 2-dimensional transverse mode field image computed for a mode propagating in a nominally "pre-tilted" index UGRIP fiber designed to operate at a bend radius of 7.5 cm—with a linear index decrease with increasing value of x—for the case of a straight/unbent fiber.
FIGS. 2b and 2c shows similar 2-D transverse mode field images for the cases of bend radii of 7 cm and 5 cm respectively. Note that the mode field and mode propagation in this fiber is best for the case of the 7 cm bend radius, close to the design value of 7.5 cm.

As shown in FIGS. 2a-2c, mode profiles for some embodiments are nominally pre-tilted with a linear index that decreases with an increasing value of x for a straight/unbent fiber—designed for a bend radius of 7.5 cm—as shown in FIG. 2a. FIGS. 2b and 2c show mode profiles for bend radii of 7 cm and 5 cm respectively. The fiber of this embodiment was created by piecewise segments of linearly decreasing steps in the index profile for a hexagonal multi-element core and the cladding. The refractive index decreases in a stepwise fashion in the x-direction. As shown in FIG. 2a, the mode in the unbent fiber—designed for a bend radius of 7.5 cm—is on the left side since the index is decreasing from left to right. As the fiber is bent, the effective index increases towards the right and the mode shifts to the right. At a bend/coil radius of 7 cm, as shown in FIG. 2b, the bend-induced change to the effective index counteracts the original tilt of the index so that the mode is centered or substantially centered, and experiences minimum bend loss. Further bending to a coil radius of 5 cm, as shown in FIG. 2c, results in localization of the mode to the right of the core, and increased losses with further bending. m In addition to stepwise changes, the tilt may be accomplished as a gradient or grading. The tilt, gradient or grading may also be incremental or continuous. In other embodiments, a graded index tilt may be obtained by using a custom fiber preform in which two opposing sides of a conventional circular step-index or graded-index preform have been shaped—preferably, but not necessarily to flat surfaces—and the refractive index gradient is achieved during the draw process in a draw furnace such that the two flat surfaces are adjacent to two distinct heating elements, which may be flat, whose temperatures are different, thereby causing the draw process to yield a drawn fiber with a stress and index gradient.

Figure 2D:
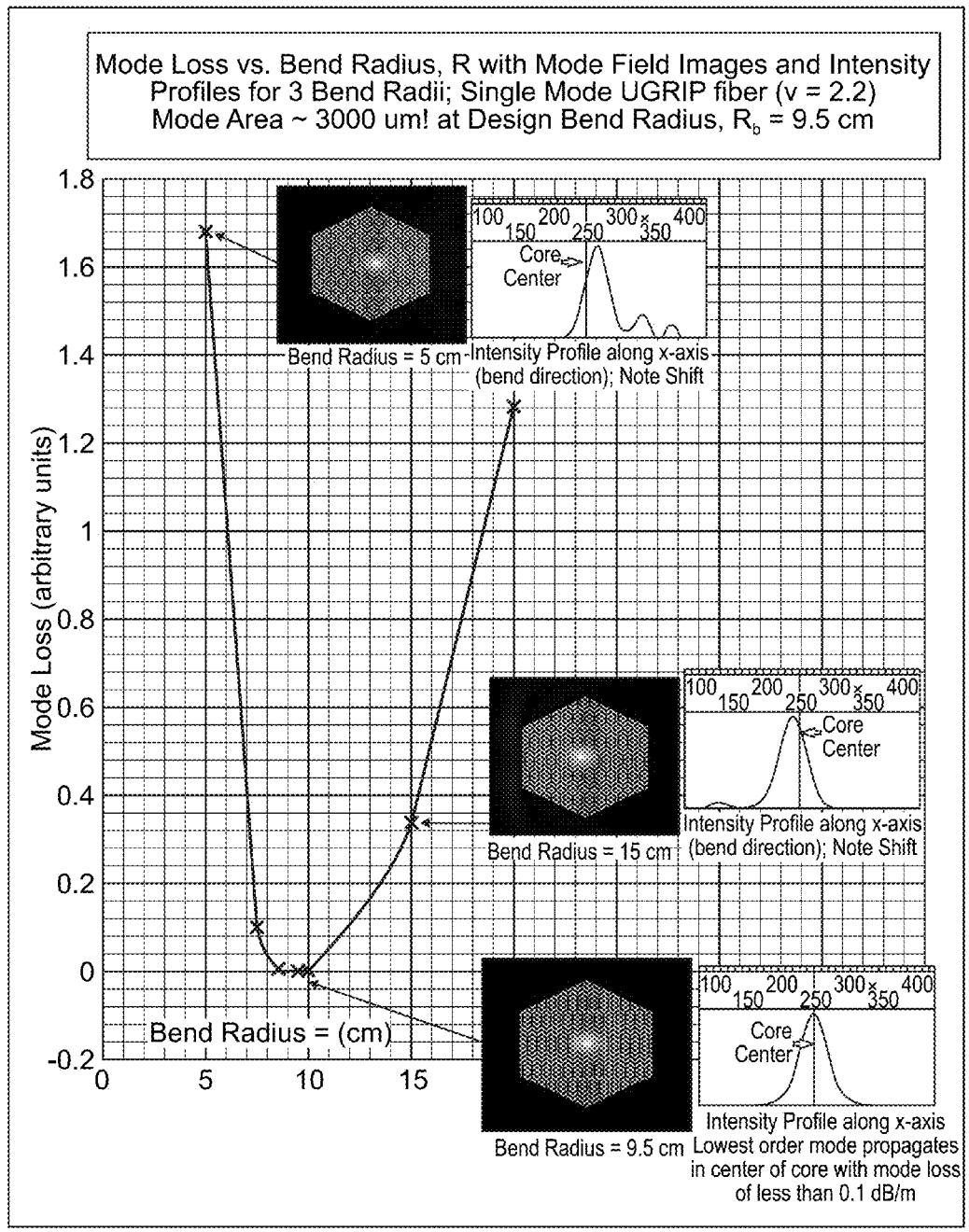
FIG. 2d shows computed plots of higher resolution mode field images, intensity profile cross sections, and mode losses versus bend radius for three bend radii for another single-mode UGRIP fiber designed for a mode area of 3000 square microns at an optimized bend radius of 9.5 cm and an index tilt of approximately $10^{-5}$ per micron.

FIG. 2d shows another embodiment of the present invention with a computation using a finer gradation of the index tilt along the x-axis, for a fiber designed for a bend radius of 9.5 cm, so that the lowest order mode has an area of 3000 $um^2$ at a bend radius of 9.5 cm. The computations clearly show that the mode propagates well in the center of the core at the 9.5 cm design bend radius with a mode loss of less than 0.1 dB/m. An index tilt of approximately $10^{-5}$ per micron is preferred but may be $1.5 \times 10^{-5}$/μm, $2 \times 10^{-5}$/um or in the range of $1 \times 10^{-3}$ to $1 \times 10^{-7}$/um.

As is the case for photonic crystal fibers (PCFs) fabricated by a stack and draw technique, in which the preform consists of a collection of capillary tubes that are drawn into the PCF fiber, the air holes in the capillary tubes reduce the effective index in the fiber. One method to create the present fiber is to start with a preform in which small rods of very precise refractive index are arranged in rows to create the desired refractive index profiles, including addition of suitably elevated refractive index rods, doped with the desired rare earth or other gain dopants such as Yb if necessary, for the region comprising the core. Another method to create the embodiments described herein is to vary the effective refractive index in the cladding and/or core in a chosen direction in the vicinity of the core to achieve the desired tilted refractive index profile by monotonically varying the size of the air holes in the capillary tubes along a desired direction, with appropriate modifications to the index values, and thus of the hole sizes in the capillary tubes comprising the core region. The use of appropriate anisotropic cladding shapes or flat surfaces aligned parallel or perpendicular to the direction of the index gradient should help keep track of the direction of the index change, and thus of the direction of the winding/coiling of the fiber around the spools to precisely neutralize the bend loss that would have been experienced during the winding of a conventional LMA fiber around the spool.

The present invention further provides a method of fabrication that uses preforms that may be fabricated by using an appropriately designed core surrounded by layers of hollow capillary tubes of continually varying air-hole sizes. Embodiments deploying this design are shown in FIGS. 3 and 4.

Figure 3:
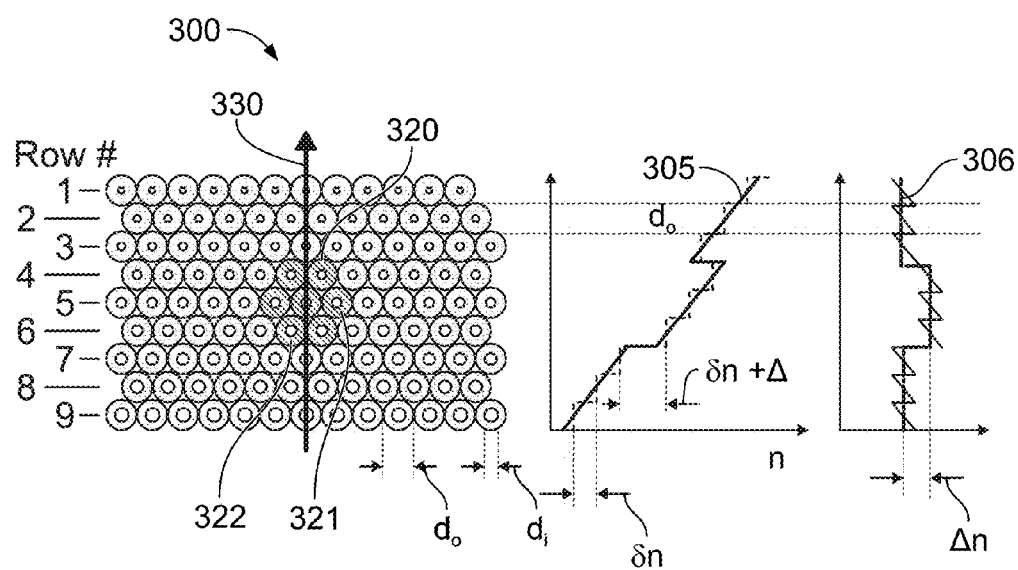
FIG. 3 depicts a stacking algorithm of one embodiment of the present invention for achieving a desired anisotropic or "tilted" index profile in a microstructured fiber preform. Note that the stacking algorithm could consist of rows of solid rods of successively lower refractive index of step size $\Delta n$ (in this example, the highest refractive index rods in the cladding region are in the top row and the lowest refractive index rods in the cladding region are in the bottom row, while the refractive indices of rods in the core region are elevated from the rods adjacent to them by an amount $\Delta n$. Such refractive index gradients can also be used by using materials (such as glasses of constant refractive index) but shaped in the form of tubes with varying hole sizes as depicted in the drawing on the left side of this figure. The rightmost portion of this figure indicates the anticipated modification to the refractive index profile at the optimal bend radius.

FIG. 3 depicts a stacking algorithm of one embodiment of the present invention for achieving a desired index profile in a microstructured fiber preform 300 that may be used to construct optical fibers in accordance with the present invention. As shown, $d_o$ and $d_i$ indicate the outer and inner diameters of reduced capillary tube elements that are arranged in rows 1-9. A pre-planned variation in the diameter of $d_i$ from row to row in this 9-row design results in the effective index profiles of the unbent UGRIP fiber (line 305) and that of the fiber bent (line 306) at a pre-designated bend radius. FIG. 3 also illustrates how holey fiber (HF) preforms 300 may be fabricated by stacking capillary tubes around one or more undoped or rare-earth doped capillary core rods 320-322 (darker shading) of the same outer diameter with varying inner diameters. While the preferred embodiment shows the use of circular tubes, solid rods and other tube patterns, shapes, configurations and dimensions may also be used in accordance with the teachings of the present invention.

The structures described herein may be fabricated via ultrasonic drilling of solid glass preforms and by using the other techniques described below. Lastly, arrow 330 indicates the direction of the general unidirectional increase in the refractive index, which may be achieved by small incremental increases in the effective refractive index from one row to the next in the cladding region, with row 9 in the cladding region having the largest holes and the smallest average refractive index and row 1 in the cladding region having the smallest holes and largest average refractive index. The refractive index in the core regions will have to be increased in a manner that enables the desired light guiding properties.

Table 2 shows representative design parameters for fabrication of a unidirectional linear refractive index gradient preforms of an embodiment of the present invention using a 9-row varying inner diameter capillary tube designs.

TABLE 2

Design parameters for fabrication of a unidirectional linear refractive index gradient preform with capillary tubes of varying diameter. Designed refractive index values (column 2) and inner diameters (column 3) are given for each row of this 9-layer perform. The corresponding diameters of the holes in the rows of the drawn fiber are indicated in Column 4. This design corresponds to a $\delta n = 3 \times 10^{-4}$ (refractive index gradient of the capillary tube) and a $\Delta n = 4 \times 10^{-4}$ (size of corrected step index) and linear index gradient of $1.4 \times 10^{-4}$/micron in the fiber design.

| Row number | $n_{eff}$, effective refractive index | $D_i$, inner diameter of hole in capillary tube, μm | $d_i$, inner diameter of hole in fiber, μm |
|---|---|---|---|
| 9 | 1.4569 | 163 | 1.63 |
| 8 | 1.4572 | 154 | 1.54 |
| 7 | 1.4575 | 146 | 1.46 |
| 6(clad) | 1.4578 | 136 | 1.36 |
| 5(clad) | 1.4581 | 127 | 1.27 |
| 4(clad) | 1.4584 | 116 | 1.16 |
| 3 | 1.4587 | 104 | 1.04 |
| 2 | 1.459 | 91 | 0.91 |
| 1 | 1.4593 | 75 | 0.75 |
| 6(core) | 1.4582 | 123 | 1.23 |
| 5(core) | 1.4585 | 112 | 1.12 |
| 4(core) | 1.4588 | 100 | 1 |

Figure 4A:
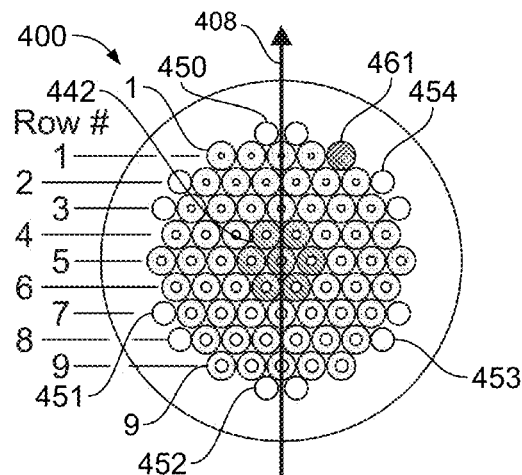
FIGS. 4a-4c show an embodiment of a preform of the present invention with monotonically varying hole sizes using (a) circular, (b) hexagonal and (c) rectangular outer preform shapes. A highly preferred trapezoidal or triangular shape similar to FIG. 4c could be created by reducing the width of the low index region near the bottom of FIG. 4c, say to a value between 0 and 90 percent of the value shown in FIG. 4c.
Figure 4B:
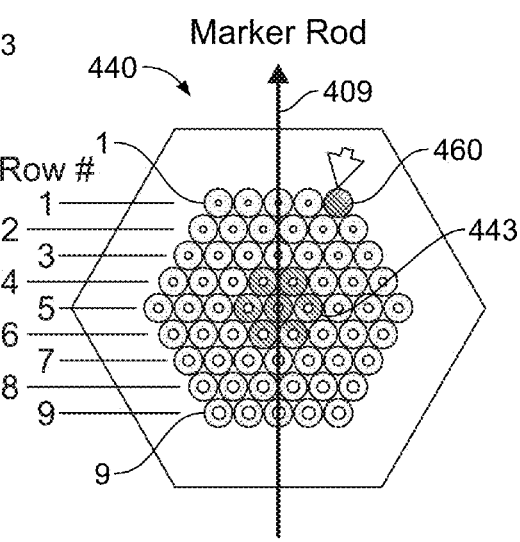
Figure 4C:
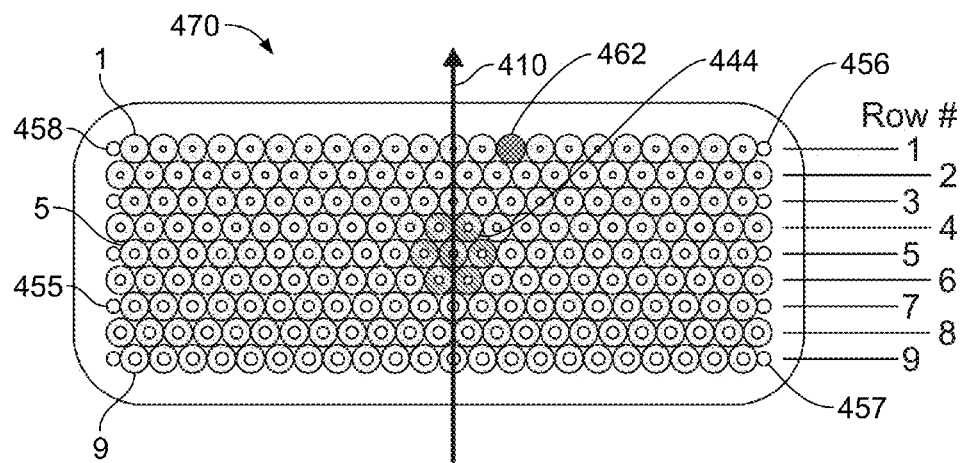

FIGS. 4a-4c depict three different external cladding shapes of the present invention that are constructed in a manner similar to the embodiment shown in FIG. 3. The microstructured fiber preforms are based on a nine-row structure and the core consists of two rings (3 rows).

Additional rows may also be used and alternate core designs may also be used including offsetting the location of the core to accommodate a change produced by a known bend radius. Also, while circular openings are shown, other patterns and shapes, configurations and dimensions may also be used. In a preferred embodiment the preform and subsequent fiber has one or more flat surfaces to enhance coupling.

Specifically, FIGS. 4a-4c show preforms with monotonically varying hole sizes from row 9 to row 1 using (a) circular 400, (b) hexagonal 440 and (c) rectangular 470 outer preforms. As an example, for capillary tubes of outer diameter $D_o=1$ mm, the rectangular perform may be constructed to have outer dimensions of 11 mm×24 mm. A common feature of the preform designs depicted in FIGS. 3 and 4 is that they may employ unidirectional grading of the refractive index profile by either varying the refractive index of rod-type elements in successive rows or by varying the size of the capillary holes from row to row, with the holes in row 9 being the largest and the holes progressively decreasing in size to row 1. Arrows 408-410 indicate the unidirectional increase in the refractive index or tilt. This increase in tilt may also be deployed in the rows making up cores 442-444.

As stated above, a preferred embodiment of the preform and any subsequent fiber may have one or more flat surfaces to enhance coupling. Configurations that may be so arranged include, but are not limited to, a triangular or trapezoidal shaped preform which can be easily achieved by reducing the width of Row 9 and using an outer triangular or trapezoidal shaped holding tube.

In preforms 400 and 470, one or more opposingly located solid rods 450-458 may be located near the periphery of the outer one or more containment tubes (which can also be of lower index material for pump diode confinement), which act as spacer rods that create a more stable and rugged structure. The tubes making up the rows may be held in place either by fusing and sealing one end (which becomes the top end) or by using matched porous or nonporous retaining plate cap structures that are fused to one or both ends of the preform. The porous structures enable control of internal gas pressure and the use of an inert gas such as nitrogen or argon. The nonporous retaining plate structures are used for fiber draws with pre-set internal pressures.

Figure 6:
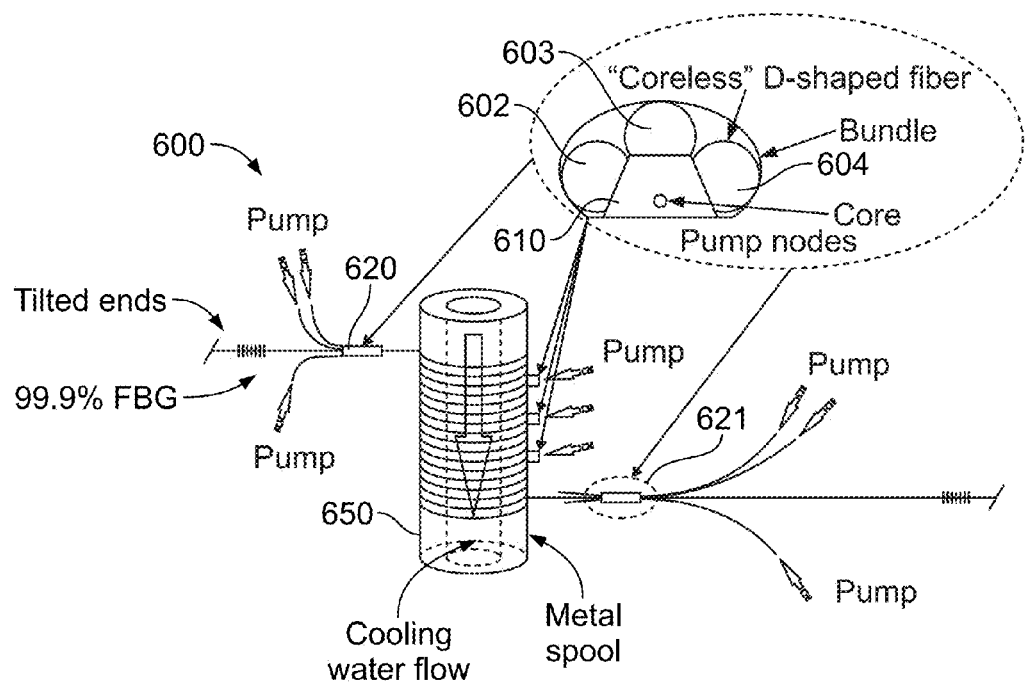
FIG. 6 is a schematic of a near-monolithic high-power laser design showing details of a side-pumping geometry that may be used at multiple pump nodes for an embodiment of the present invention.

Although the circular containment tubes of FIG. 4a is one preferred embodiment because of the relative ease of obtaining circular containment tubes, as shown in rows 1-9, and their match to the cylindrical symmetry of the heating furnace that may be used to create the fibers, the hexagonal and rectangular tube structures present another preferred embodiment as a result of the flat external surfaces provided, which are convenient for side-coupled pumping of fiber lasers as shown in FIG. 6. The flat surfaces may also facilitate tracking of the direction of the index gradient, facilitating coiling of the fiber around the surface of a drum or spool to be used while retaining the same orientation of the pre-tilt index gradient relative to the direction of fiber bending.

Other embodiments of the invention may include marker rods 460-462, as shown in FIGS. 4a-4c. The marker rods may consist of a doped absorbing or fluorescent material—for visual tracking of the direction of the refractive index tilt. The rods may be placed in the high index direction of the refractive index gradient, and may be kept slightly off center to minimize effect on the fiber mode. Thus, the side of a fiber to be coupled to a spool or other surface is identified by the markers. For example, marker rod 462 identifies the flat surface which will become the inner edge of the bent fiber which is coupled to a spool in which a fiber is wrapped around.

As an illustrative example of typical dimensions, for the 9-row embodiments discussed above, an outer capillary tube diameter of 2 mm in FIGS. 4a and 4b correspond roughly to preforms of maximum dimensions of approximately 1 inch. A 1 mm capillary diameter for the rectangular preform of FIG. 4c will result in a preform of approximately 11 mm×22 mm.

Figure 7:
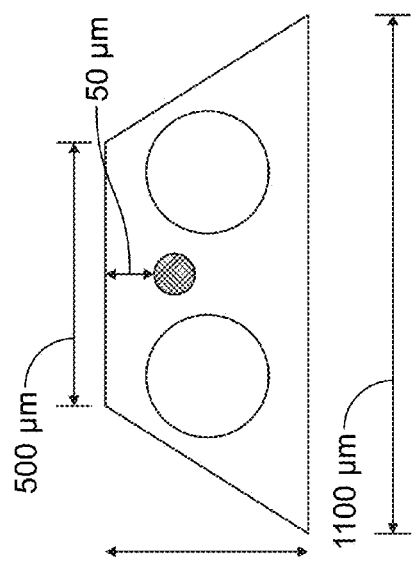
FIGS. 7 and 8 show examples of a trapezoidal fiber with stress elements, and a trapezoidal preform, with monotonically varying hole sizes in capillary tubes in the preform.
Figure 8:
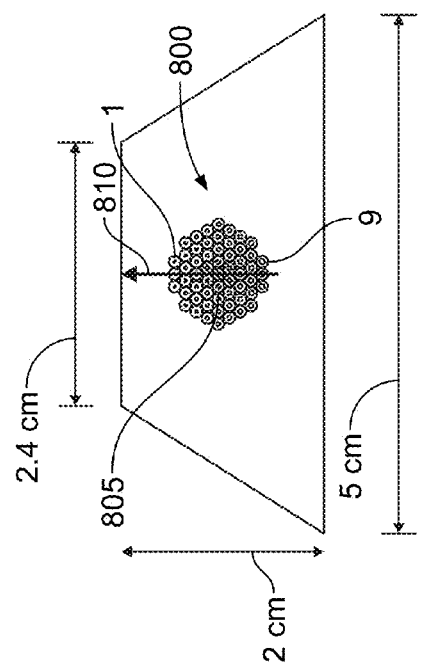

Another UGRIP fiber shape of the present invention is that of a trapezoid—as discussed above—and also shown in FIGS. 7-9. This embodiment has the advantage of providing information on the direction of the index gradient without the need for additional marker rods. The trapezoidal shape enables memory of the direction of index tilt. The small thickness enables small bend radii (R<20 cm) and the large width allows for the insertion of stress members such as borosilicate stress members. The large base (~1 mm) enables good heat transfer to a cooled spool. In addition, the proximity of the core to the top surface facilitates fiber Bragg grating (FBG) fabrication directly into fibers doped with photosensitive dopants such as germania. Flat surfaces (sides and top) also facilitate efficient lateral pump coupling. In a preferred embodiment as shown in FIG. 8, a hexagonal design 800 is provided having rows 1-9 and a core 805. The capillary OD=1 mm and the capillary ID ranges from 36 um (row 1) to 81 um (row 9) with a capillary step of 5um, resulting in an increasing tilt as shown by arrow 810.

The designed refractive index values (Column 2) correspond to an index step of $3 \times 10^{-4}$ between adjacent reduced tube elements in the drawn fiber, corresponding to an index gradient of $1.5 \times 10^{-5}$/um in the UGRIP fiber, assuming a reduction factor of 100:1 in the preform to-fiber conversion. Based on this design, the inner diameter for the holes in the capillary tube, are tabulated in Column 3 of Table 2. For an undoped fiber, or for doped fibers in which the refractive index of the core capillary tubes can be matched precisely to the refractive index of the cladding capillary tubes, the desired step index (targeted at $4 \times 10^{-4}$) can be readily achieved by simply reducing the diameters of the holes in the core rods for the same row as shown in the last three rows of Table 2.

Figure 5:
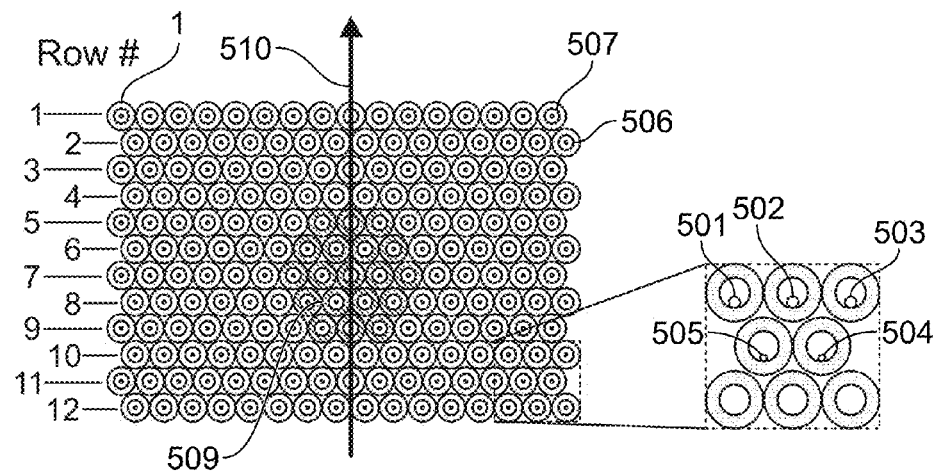
FIG. 5 shows a preform of an embodiment of the present invention, such that fibers of varying sizes are inserted in successive rows in each of the capillary tubes comprising the anisotropically varying preform with a magnified view of fiber inserts for rows 10-12.

FIG. 5 and Table 3 provide an alternate embodiment of the present invention. In this embodiment, capillary tubes of fixed diameter are used, and a linear index variation is attained by varying the average refractive index unidirectionally in the preform by inserting fibers of varying diameters in the holes of the capillary tubes to achieve the desired effective index profile by reducing the effective size of the opening.

TABLE 3

Design parameters for fabrication of a unidirectional linear refractive index gradient perform with capillary tubes of fixed diameter and fiber inserts of varying diameter. Designed refractive index values (column 2) and diameter of fiber insert (column 4) are given for each row of the 9 layer perform as required to achieve an index gradient of $1.5 \times 10^{-5}$ /micron in the microstructured fiber. This design corresponds to a $\delta n = 3 \times 10^{-4}$ (refractive index gradient of the capillary tube) and a $\Delta n = 4 \times 10^{-4}$ (size of corrected step index).

| Row number | $n_{eff,I}$ effective refractive index | $D_i$, inner diameter of hole in capillary tube (μm) | Diameter of fiber insert in perform (μm) |
|---|---|---|---|
| 9 | 1.4569 | 1000 | 0 |
| 8 | 1.4572 | 1000 | 26 |
| 7 | 1.4575 | 1000 | 36 |

TABLE 3-continued

Design parameters for fabrication of a unidirectional linear refractive index gradient perform with capillary tubes of fixed diameter and fiber inserts of varying diameter. Designed refractive index values (column 2) and diameter of fiber insert (column 4) are given for each row of the 9 layer perform as required to achieve an index gradient of $1.5 \times 10^{-5}$ /micron in the microstructured fiber. This design corresponds to a $\delta n = 3 \times 10^{-4}$ (refractive index gradient of the capillary tube) and a $\Delta n = 4 \times 10^{-4}$ (size of corrected step index).

| Row number | $n_{\it eff,I}$ effective refractive index | $D_i$, inner diameter of hole in capillary tube (μm) | Diameter of fiber insert in perform (μm) |
|---|---|---|---|
| 6(clad) | 1.4578 | 1000 | 44 |
| 5(clad) | 1.4581 | 1000 | 51 |
| 4(clad) | 1.4584 | 1000 | 57 |
| 3 | 1.4587 | 1000 | 62 |
| 2 | 1.459 | 1000 | 67 |
| 1 | 1.4593 | 1000 | 72 |
| 6(core) | 1.4582 | 1000 | 53 |
| 5(core) | 1.4585 | 1000 | 59 |
| 4(core) | 1.4588 | 1000 | 64 |

Column 4 of Table 3 shows the calculated diameters of the one or more fiber inserts 501-507 needed in each row to achieve an index gradient similar to the inner diameter capillary tube designs of FIG. 4 and Table 2. This technique may also be deployed in the rows making up core 509 as well. The resulting increasing tilt is shown by arrow 510.

A method of fabricating the embodiment shown in FIG. 5 is to insert fibers 501-507—with the size protocol described in Table 3—into 1 m long horizontal capillary tubes of appropriate diameter, and to then seal both ends with a hydrogen torch in a manner that will result in strong attachment of the fiber inserts at the top end of the final preform. In alternate designs, to achieve pressure control inside the capillary tubes, fabrication will use porous end caps at the two ends of the preform structure—based on thick layers of fiberglass or porous sol-gel caps—to enable control of the hole sizes in the drawn microstructured fiber.

10 kW-100 kW fiber arrays require higher power single elements and scalable beam combining techniques, such as the use of side pumping for efficient power scaling. As a result, the present invention provides a near-monolithic high power fiber laser system 600 as shown in FIG. 6. In this embodiment, one or more D-shaped pump fibers 602-604 are coupled to fiber 610. Fiber designs having flat surfaces are preferred to improve coupling. In addition, the one or more D-shaped pump fibers 602-604 may also have a tilted index profile (with the refractive index increasing from the cylindrical edge to the flat edge), which increases the pumping efficiency by enhancing coupling from the interface of the low index D-shaped fiber to the high index fiber 610.

The refractive index tilts in opposingly shaped trapezoids will be in opposite directions relative to the wide bases, i.e., such that the index gradients will all be pointed in the same direction to allow effective compensation for bend-induced index tilts. Alternatively, these array sections could be very short straight sections such that the propagation losses are negligible, and the straight sections have been designed simply to facilitate coherent coupling in a rugged well-designed packaged configuration.

In the preferred embodiment illustrated in FIG. 6, the D-shaped pump fibers are coupled to Yb double clad UGRIP fibers 610, which may be rectangular or semi-hexagonal in shape. The fibers are bundled together into laterally confined contact-coupled packages of a few centimeter lengths to form one or more pump nodes 620 and 621. Such compact close contact and bundled assemblies for the pump nodes may be designed to ensure high stability against environmental perturbations. Multiple pump nodes may be used—as needed—for power scaling due to the flexibility afforded by this method of side pumping.

A small straight portion of tilted index semi-hexagonal fiber at both ends of the laser may be used to remove higher order modes (via use of mode-dependent losses in these UGRIP fibers, analogous to using coiled regions in conventional non-tilted index fibers). The water-cooled metallic grooved cylinder 650 may be used to spool the fibers and will remove heat generated inside the fiber laser.

In other embodiments, fabrication techniques similar to those used for the fabrication of holey fibers may be used. For such an implementation, the preform will be made using a central core rod and a series of hollow capillary tubes of continually varying air-hole sizes. The holes in the tubes reduce the effective index in the fiber when the preform, consisting of the collection of tubes, is drawn into a fiber. By monotonically varying the size of the air holes in the tubes, the effective refractive index in the cladding in a chosen direction may be varied or predetermined to achieve the desired tilted refractive index profile.

Anisotropic cladding shapes and coatings may also be used to help keep track of the direction of the index change, and thus of the direction of the winding of the fiber around the spools to precisely neutralize the bend loss that would have been experienced during the winding of a conventional LMA fiber around the spool. The embodiments of the present invention may achieve a bend loss of less than 0.1 dB/m, even with bend radii as small as 10 cm while providing relatively compact footprints for LMA-based fiber lasers.

In other embodiments, the fibers of the present invention may be constructed by a two-step process. In the first step, the preform is introduced into the furnace of a fiber drawing tower and is heated to about 2000° C., where it is fused together and drawn down to the order of millimeter size, using gravity and pressure. In a preferred embodiment, a microstructured fiber may be fabricated by using a capillary stacking and draw method in accordance with the following parameters: Temperature: 1650-2300 degrees C., Feed rate: 1-5 mm/min, Pressure: 1.5-5.5 torr. Through careful process control, the air holes retain their arrangement all through the drawing process and even fibers with very complex designs and high air filling fraction can be produced.

In other embodiments, holey fiber (HF) preforms may be fabricated by stacking capillary tubes around a rare-earth doped solid rod of the same outer diameter. The RE-doped solid rod (which becomes the core subsequent to the fiber draw) is fabricated by using a conventional MCVD process to obtain a high dopant distribution in the center, and will have a ring-like elevated index near its periphery with a NA of ~0.05 or lower ($\Delta n \sim 8 \times 10^{-4}$). High Yb and Er concentrations may be used along with phosphate co-doping to reduce the effect of concentration quenching of the Er ions. In addition, the inner rod may be Ge-doped to make the core photosensitive and thereby enable the fabrication of in-line gratings.

Figure 9A:
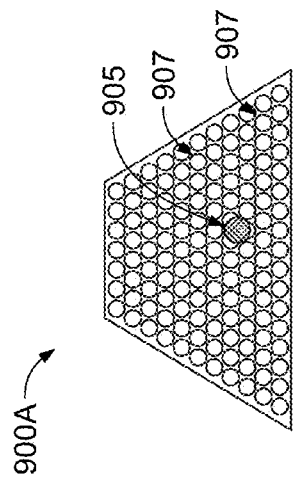
FIGS. 9a-9c show a capillary tube pattern of an embodiment of the present invention forming a central portion of a preform for fabricating a holey fiber with a tilted index, such that the refractive index decreases monotonically in the +y direction, b) drawn fiber, and c) a 12 stacked fiber structure which is fused and tapered to facilitate beam combining.
Figure 9B:
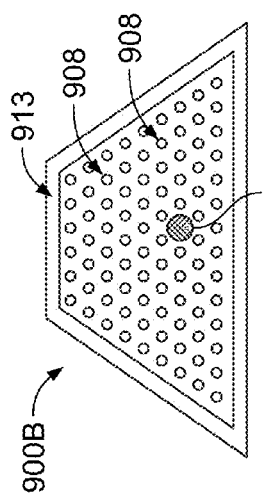
Figure 9C:
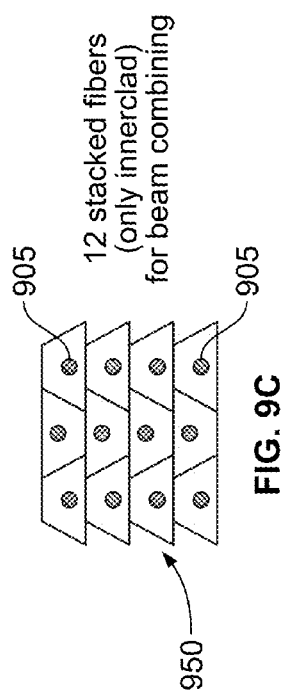

As shown in FIGS. 9a-9c, an alternate embodiment of the present invention provides semi-hexagonal inner cladding shapes 900A and 900B created by pre-fusing the initial circular preforms and slicing off sections to obtain modified inner cladding preforms having at least one straight edge.

Straight-edged preforms such as semi-hexagonal or rectangular inner-clad fibers, are preferred, as they facilitate power scaling via beam combining, by enabling easy stacking arrangements. As shown in FIG. 9c, double clad fibers may be stacked, fused and tapered to a produce a composite structure 950—if needed—to facilitate beam combining.

These modified preforms, which may include rare-earth (RE)-doped solid tube cores 905, capillary tubes 907, and air holes 908 may be configured as described above. The preform is drawn into the desired advanced double clad fiber (DCF). Subsequent to the drawing process, the glass inner claddings may be coated with a low index polymer outer cladding 913 to obtain the final fibers. To preserve the orientation of the fiber and memory of the tilt-index, these coatings may be made to conform to the shape of the fiber. Such low-index polymeric cladding materials are generally very absorbing in the ultraviolet and will thus be removed for the grating (FBG) fabrication process, followed by a recoating to reduce the pump losses in these regimes. To make such fibers sensitive to UV light, a Ge dopant may be added. The core may also be located near the flat surface to ensure that a strong FBG is obtained.

As an alternative, the lower index outer cladding region of the DCF fiber may be fabricated by enlarging the hole sizes of two or more rows of capillaries at the desired distance from the core. This will enable circumvention of the use of a polymer cladding. Likewise D-shaped coreless pumping fibers may also be drawn in a similar way. Polarization maintenance in such fibers is achieved by either using boron stress rods or by proper arrangement of different air hole sizes along two different directions around the core.

Figure 10:
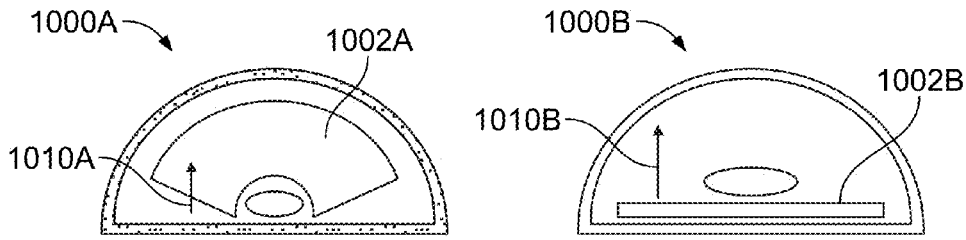
FIG. 10 shows D-shaped fibers with asymmetric stress elements to create the desired anisotropic refractive index tilt.

FIG. 10 shows D-shaped fibers 1000A and 1000B with asymmetric stress elements 1002A and 1000B. The stress elements are used to create the built-in anisotropy. The directions of the arrows 1010A and 1010B represent the directions of the increasing refractive index tilt. Fabrication of such fibers with built-in refractive index tilts may be achieved by the combined use of several fabrication techniques. These include: (i) insertion of stress lobes in the fiber in an asymmetric manner, (ii) the use of preferential flame etching to remove dopants from one side of the MCVD preform (as is the case with "bow-tie" fibers) and (iii) the use of an anisotropic distribution of "holey" fibers (as discussed before). The highly anisotropic cladding shapes and coatings will simplify keeping track of the direction of the index change.

In one preferred embodiment, the present invention includes all of the following criteria: An advanced LMA core design, enabling "single mode" areas of >1000 µm² with bend losses of <0.1 dB/m (i.e. total bend losses of <2 dB for a 20 m long fiber). A Yb-dopant profile with a gain in the lowest order transverse mode (i.e. with a higher concentration of optically pumped Yb-dopant near the center of the mode). A large net birefringence at the core of the order of $5 \times 10^{-4}$ or larger to facilitate polarization maintenance.

Figure 11:
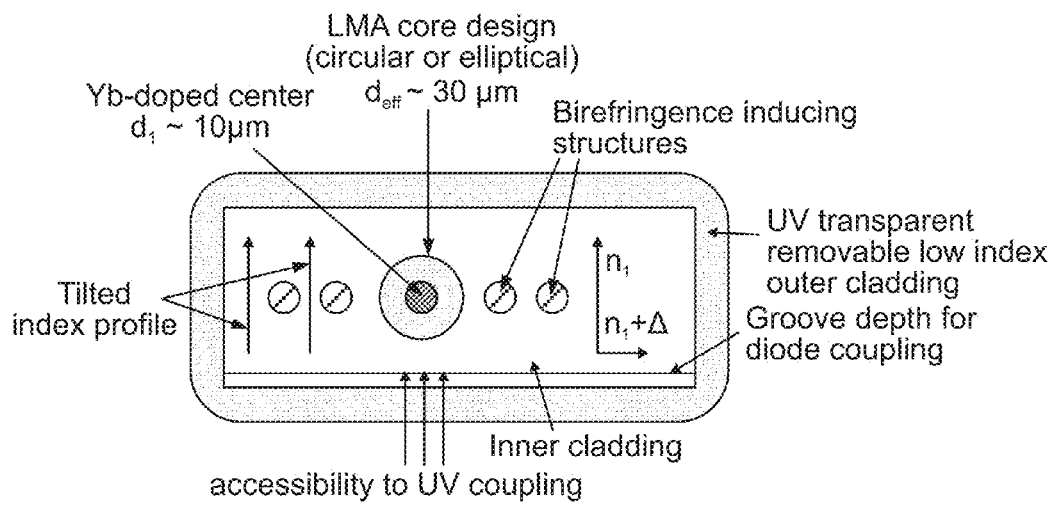
FIG. 11 illustrates a design of an embodiment of the present invention.
Figure 12:
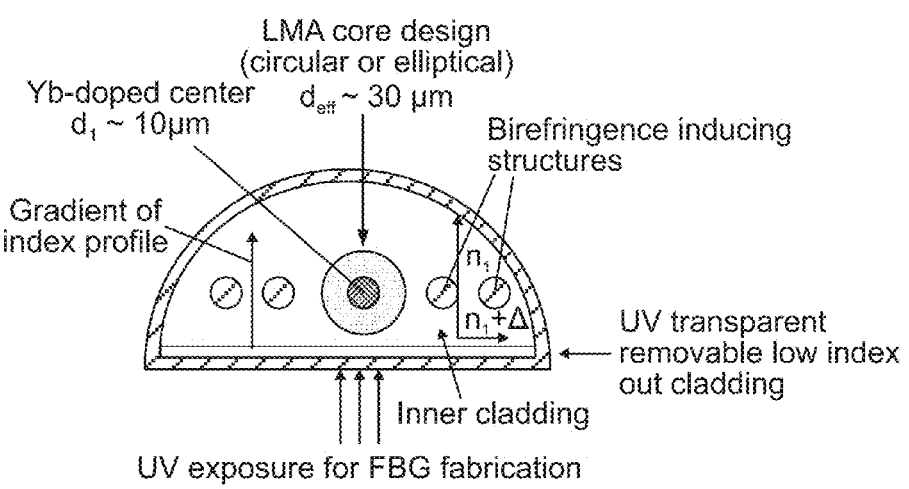
FIG. 12 illustrates another design of an embodiment of the present invention.

Other embodiments may include dopants (such as Ge or B) at strategic locations in the fiber or by using other stress inducing structures such as borosilicate rods or appropriate air-hole distribution in the preform (and thus the fiber). An inner cladding design which is not circularly symmetric, and which yields a relatively small inner-cladding-to-core area ratio (<50), combined with a significantly large peak Yb dopant density (~10,000 ppm) to enable efficient absorption of the pump radiation for high slope and optical-to-optical power conversion efficiencies. A core dopant (Ge) that enables photosensitivity and fabrication of FBGs and large-period gratings (LPGs) in the core or cladding directly in the Yb-doped fibers (YDFs) may also be used. Offsetting of the LMA core to one side of a flat-faced inner cladding (and an easily removable polymer outer cladding of low refractive index) may be used to enable lithography of FBGs and LPGs on the fiber. In accordance with one or more of the criteria described above, several preferred embodiments are shown in FIGS. 11 and 12.

In other aspects, embodiments of the present invention provide HF preforms fabricated by stacking capillary tubes around a solid rod of the same outer diameter, $d_0$. The solid rod (which will form the core) may be fabricated by a conventional MCVD process to obtain a very high dopant distribution in the center (up to a diameter of ~$d_0/2$), and will have a ring like elevated index near its periphery with a NA of ~0.05 or lower ($\Delta n \sim 8 \times 10^{-4}$). High Yb concentrations (between 3,000 ppm and 15,000 ppm) may be used along with aluminum co-doping to reduce the effect of concentration quenching of the Yb ions. In addition, the inner rod may be Ge doped to make the core photosensitive and thereby enable the fabrication of in-line gratings.

Figure 13A:
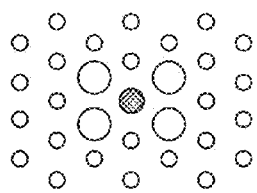
FIGS. 13a-13b depict a rectangular double clad design of an embodiment of the present invention.
Figure 13B:
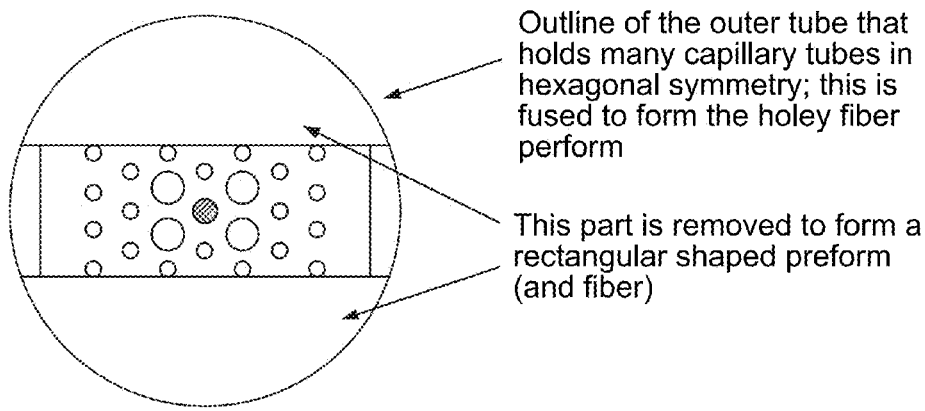

FIGS. 13a and 13b illustrate another embodiment of the present invention. As shown in FIG. 13a, birefringence is achieved by adding a second anisotropic feature, e.g., by using air holes of two different diameters along two orthogonal axes near the core. This embodiment provides an effective index difference between the two orthogonal polarization modes. FIG. 13b shows how portions of circular holey preform may be removed to obtain a rectangular preform for rectangular double clad fibers. The inner cladding region will be delineated from the outer cladding region to obtain a double-clad fiber (DCF) by significantly enlarging the hole sizes of two or more rows of capillaries at a desired distance from the core. The desired thin slab rectangular and D-shaped inner cladding shapes described earlier may also be achieved by pre-fusing the initial circular preforms and slicing off sections (one cut for a D, two parallel cuts for a "near-rectangle") to obtain modified preforms as illustrated in FIG. 13b.

Sol-gel glass technology provides an inexpensive and reliable method for fabricating the fibers of the present invention. Suitable chemical precursor compositions include ethanol, water, hydrofluoric acid (HF), n, n-dimethylformamide (DMF), and tetraethyl orthosilicate with hydrofluoric acid (HF) as a catalyst for sol gel processing. DMF may also be used to minimize cracking. Two specific advantages of using HF are: HF catalyzed gels have much shorter gelation times (about 12 hours) than other catalyzed gel solutions. The bulk densities and porosities of the HF-catalyzed gels are similar to those of the base catalyzed gel. Larger average pore sizes are obtained, which help minimize cracking problems.

One suitable procedure to make the gel and reduce the capillary pressure which leads to cracking is to use a capillary pressure, Pc, which is given by $$Pc = -\frac{2\gamma l \, v \cos\theta}{r} = -\frac{2(\gamma sv - \gamma sl)}{r},$$

where θ is contact angle and rlv, γsv, and γsl, denote the interfacial tensions between the liquid and the vapor, the solid and the vapor, and the solid and the liquid respectively. In order to overcome the cracking problem by reducing the capillary pressure, DMF was introduced to reduce the average value of rlv in the solution. DMF was found to be a good drying control chemical additive, with a low rlv and a relatively low boiling point (153° C.).

Using a mixture of DMF and HF was found to be a better chemical combination for fabrication of a crack-free gel. This is because DMF lowers the interfacial tension between the liquid and the vapor. More Si—F bonds form during the gelation stage and cover the gel's surface and increase the contact angle and lowers capillary pressure leading to reduced cracking.

Figure 14:
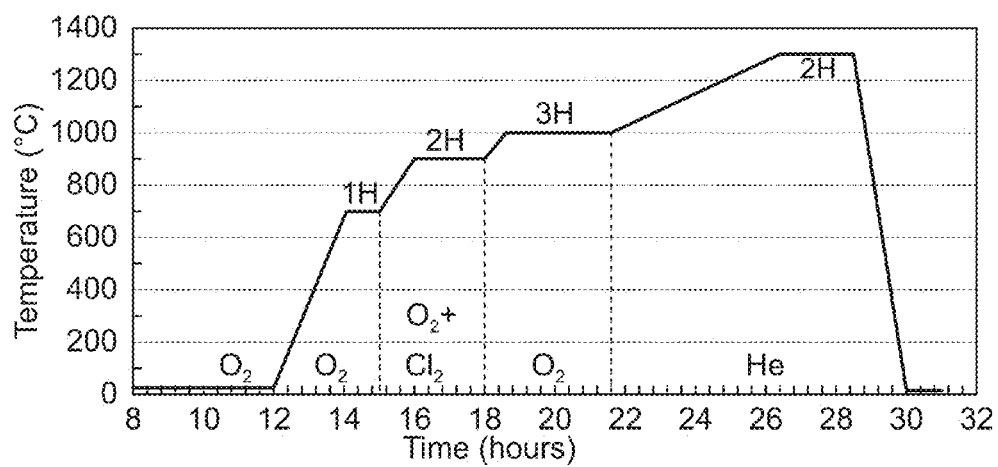
FIG. 14 is a sol-gel heating profile of an embodiment of the present invention.
Figure 18A:
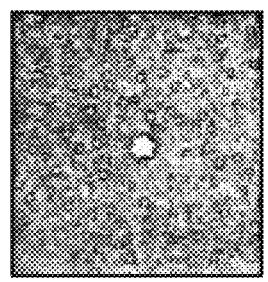
FIGS. 18a-18d show patterns created using molds similar to those schematically depicted in FIGS. 16 and 17.
Figure 18B:
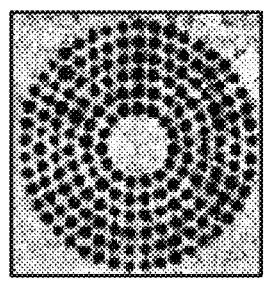
Figure 18C:
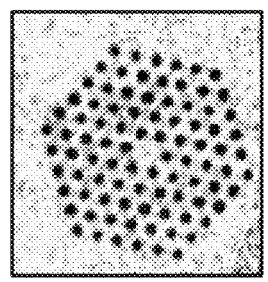
Figure 18D:
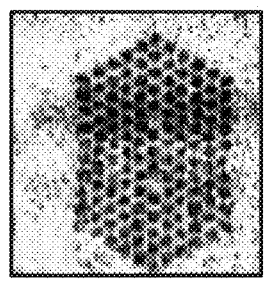

A heating profile that may be used to process the gels is shown in FIG. 14. FIG. 15 shows the various process steps of an embodiment of the present invention, in terms of four processing regions: Region I: The gelation stage: The gelation time (12 hours) is much shorter than that of other methods due to the use of HF as a catalyst. Region II: The aging stage is characterized by gradual heating for over 40 hours at temperatures between 75° C. and 180° C. The temperature of the oven is ramped at a rate of 3° C./hr from 75° C. to 90° C. The heating rate is then lowered to 1° C./hr a temperature of 110° C. is reached. The ramping rate is then adjusted to 5° C./hr until the temperature is raised to 180° C. Region III: In this "glass formation" stage, the heating profile is ramped up from 180° C. to 900° C.; as the temperature is increased, the organics and liquid solutions are more rapidly evaporated from the gel body. The heating rate should less than 1° C./min to avoid the cracking caused by large shrinkage in this stage. Region IV: In this sintering stage, the temperature is increased from 900° C. to 1150° C., leading to the process of network densification and stabilization of the final glass product.

The final design parameters for the UGRIP mold design (bend radius 7.5 cm) have been calculated and are included in Table 4 below.

| Row number | $n_{eff}$, effective refractive index | $D_i$, inner diameter of holes in the mold, μm | $d_f$, inner diameter of holes in the fiber, μm |
| --- | --- | --- | --- |
| 9 | 1.4729 | 1020 | 2.55 |
| 8 | 1.4732 | 1000 | 2.50 |
| 7 | 1.4734 | 980 | 2.45 |
| 6(clad) | 1.4737 | 960 | 2.40 |
| 5(clad) | 1.4739 | 940 | 2.35 |
| 4(clad) | 1.4742 | 920 | 2.30 |
| 3 | 1.4744 | 900 | 2.25 |
| 2 | 1.4747 | 876 | 2.19 |
| 1 | 1.4750 | 856 | 2.14 |
| 6(core) | 1.4743 | 960 | 2.40 |
| 5(core) | 1.4740 | 940 | 2.35 |
| 4(core) | 1.4738 | 916 | 2.29 |

Figure 17:
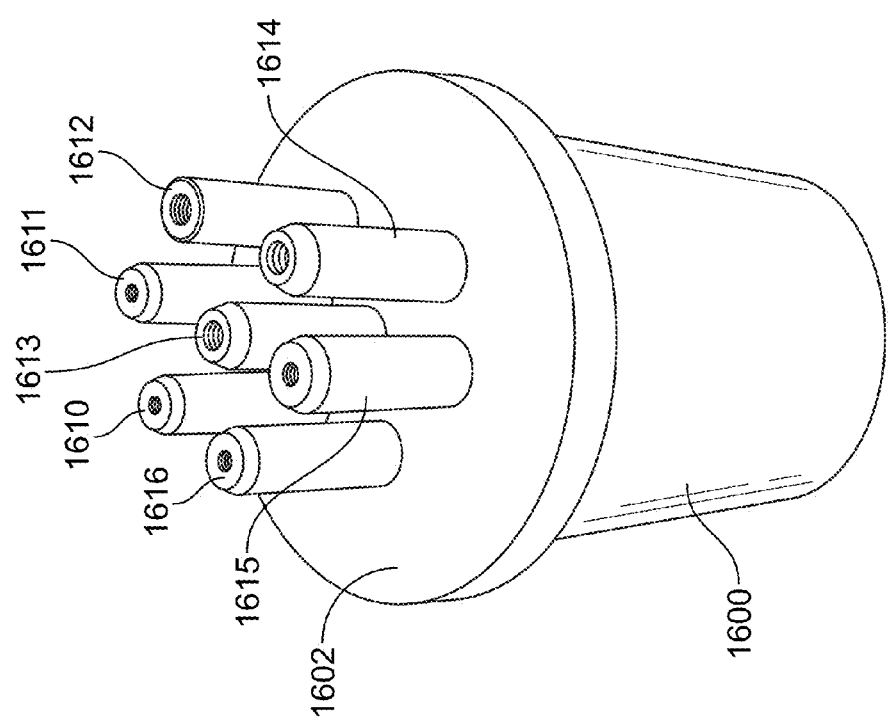
FIG. 17 shows a metallic sol-gel mold of an embodiment of the present invention.

FIGS. 16*a*-16*b* and 17 illustrate a mold that may be used in the sol-gel process to create fibers in accordance with the teachings of the present invention. As shown, container 1600 includes cap 1602 that may have a foam layer 1604 and Teflon layer 1606. A Teflon bottom 1608 is also provided. The cap also includes one or more ports 1610-1616 that are configured into a desired pattern to be transmitted to the fiber. The cap is also configured to receive one or more correspondingly configured wires 1620 to create a desired pattern such as that shown in FIG. 16*a*. The pattern is replicated in the resulting molded fiber. FIGS. 18*a*-18*d* show other exemplary patterns that may be created using the mold shown and the sol-gel processing techniques described.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. An optical fiber comprising:
a body for transmitting light, said body having an anisotropic refractive index wherein said anisotropic refractive index offsets changes in the refractive index of the fiber caused by bending the fiber;
said body made from a preform comprising a plurality of successive layers, each of said layers having a refractive index, the refractive index of each layer successively increases; and
said layers are comprised of rows of tubes having solid rods located therein wherein the reflective index of each row unidirectionally increases by varying the diameters of the rods in the tubes.

2. The optical fiber of claim 1 wherein the anisotropic refractive index varies continuously.

3. The optical fiber of claim 1 wherein the anisotropic refractive index is unidirectional and decreases in a direction away from the center of the bend, such that the rate of refractive index variation as a function of the transverse dimension of the fiber that is aligned with the direction of bending is proportional to the first order on the inverse of the design bend radius.

4. The fiber of claim 1 wherein said anisotropic refractive index changes stepwise.

5. The fiber of claim 1 wherein said anisotropic refractive index has a predefined slope.

6. The fiber of claim 1 wherein said body comprises a core and cladding.

7. The fiber of claim 6 wherein said refractive index maintains transmitted light within the core when the fiber is bent.

8. The fiber of claim 1 wherein said refractive index n due to the bending at radius R has a slope of $\delta n/\delta r \approx n/R$.

9. The fiber of claim 1 wherein said fiber has a refractive index pre-tilt of $1.5 \times 10^{-5}/\mu m$ and said fiber has a mode area greater than 500 um².

10. The optical fiber of claim 1 wherein the anisotropic refractive index substantially cancels the bend loss of the fiber when the fiber is bent at bend radii within the design bend range.

11. The optical fiber of claim 1 wherein the refractive index of each layer unidirectionally increases.

12. The optical fiber of claim 1 wherein the refractive index of each layer increase stepwise by $3 \times 10^{-4}$ between adjacent layers.

13. A method of making an optical fiber comprising the steps of:
providing a preform, said preform comprising a plurality of successive layers, each of said layers having a refractive index, the refractive index of each layer successively increases; and
drawing said preform in a furnace to create an optical fiber, said furnace heats opposing sides of said preform at different temperatures to create an anisotropic refractive index in said optical fiber.

14. The method of 13 wherein said preform is comprised of rows of solid rods or hollow tubes, said tubes having substantially the same outer diameter and each successive row of tubes having incrementally smaller inner diameters.

* * * * *